No. 766,074. PATENTED JULY 26, 1904.
E. R. SUTCLIFFE.
BRICK MAKING MACHINE.
APPLICATION FILED JULY 25, 1903.
NO MODEL. 8 SHEETS—SHEET 3.

Fig 3

Witnesses:
H. F. Cunningham
C. H. Cunningham

Inventor:
Edgar R. Sutcliffe
By Edson Bro's
Attorneys.

No. 766,074. PATENTED JULY 26, 1904.
E. R. SUTCLIFFE.
BRICK MAKING MACHINE.
APPLICATION FILED JULY 25, 1903.
NO MODEL. 8 SHEETS—SHEET 8.

Witnesses:
C. E. Schnell.
E. L. Thompson.

Inventor:
Edgar R. Sutcliffe,
by Edson Bros,
Attorneys.

No. 766,074. Patented July 26, 1904.

UNITED STATES PATENT OFFICE.

EDGAR ROUSE SUTCLIFFE, OF LEIGH, ENGLAND, ASSIGNOR TO SUTCLIFFE SPEAKMAN AND COMPANY, LIMITED, OF LEIGH, COUNTY OF LANCASTER, ENGLAND, A COMPANY OF GREAT BRITAIN.

BRICK-MAKING MACHINE.

SPECIFICATION forming part of Letters Patent No. 766,074, dated July 26, 1904.

Application filed July 25, 1903. Serial No. 167,020. (No model.)

*To all whom it may concern:*

Be it known that I, EDGAR ROUSE SUTCLIFFE, a subject of the King of Great Britain, residing at Leigh, in the county of Lancaster, England, have invented certain new and useful Improvements in Brick-Making Machines, of which the following is a specification.

The invention relates to improvements in brick-making machines in which the material is treated in a pug-mill, from which it is separated in block or clots and passed onto the pressing part of the apparatus to receive the final pressure; and the objects of the improvement are, first, to improve the quality of the bricks produced by providing that the formation of the clot shall take place under pressure and without seams; second, to reduce the loss of power occasioned in the machines now in use by the pug-mill forcing material against the closed mouth, and, third, to construct a more efficient cutting-off apparatus. I attain these objects by the mechanism illustrated in the accompanying drawings, in which—

Similar characters refer to similar parts in the several views.

A is a pug-mill of the usual vertical type, terminating in a mouthpiece B. It is provided with a central shaft C, having the ordinary knives, which pug the clay or other material while traversing it toward the mouth of the mill. The driving of the pug-mill shaft is effected through the medium of two elliptical toothed wheels D and F, of which D is attached to the shaft C and F is attached to a shaft E, to which also is attached the bevel-wheel G. The bevel-wheel G is driven from the driving-shaft by an ordinary train of wheels consisting of the bevel-pinion H, the spur-wheel I, and the pinion J. The material is fed into the pug-mill A by the feeding-trough O, in which works a knife-shaft driven by fast and loose pulleys P P. For the purpose of taking the end thrust of the pug-mill shaft a cross-head 12 is provided, being secured to the base-plate of the machine by the tension-bolts 13 and 14, which thus relieve the framework of strain.

Figure 9:
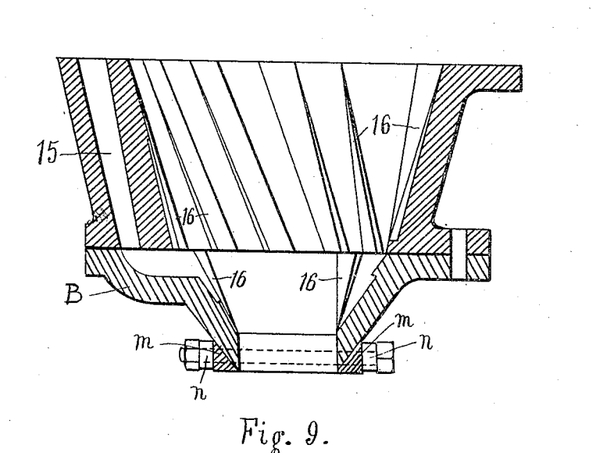
Figs. 9 and 10 are vertical and horizontal sectional views of the pug-mill, showing the spiral grooves.
Figure 10:
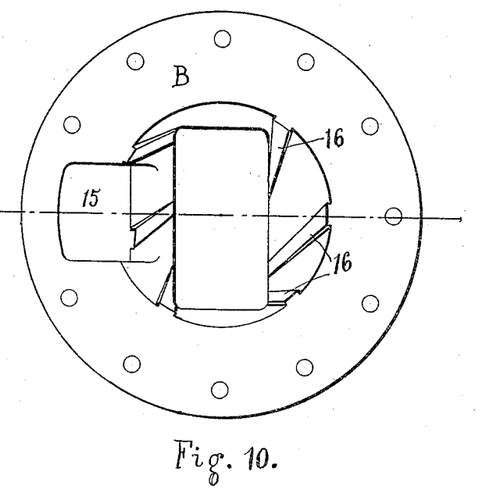

A further protection against bursting and excessive waste of power is provided by the escape-outlet 15, through which if too much material passes the screw the surplus can find its way back into the pug-mill. In order to insure that the material shall be as free as possible from lamination when passing the screw and that the pressure shall be maintained in the mouth of the pug-mill, spiral grooves 16 are cut on the face of same instead of the straight grooving, which has been usual heretofore on this class of machine. It is found that the spiral grooving assists in traversing the material forward under pressure.

At the mouth of the pug-mill a reciprocating mold-box $d$, containing a mold R and plunger S, is so arranged that when filled with material the mold, together with the plunger, may be drawn clear of the pug-mill and the clot of clay pressed up out of the mold.

The particular feature of the invention is that during the filling of the mold R the plunger S, starting at the top of the mold, so that it closes the mouth of the pug-mill, is slowly retired, so as to maintain a continuous pressure on the incoming material. This is effected by causing the bottom of the plunger S to rest on the upper surface of a small platform T, which is forced downward by the pressure of the clay coming from the pug-mill, the movement of the platform T being regulated by the cam Q, operating through the levers Z and Y, the rocking shaft W, the lever X, and the link V, all connected together by suitable pivots. The platform T is inclosed within a casing U, in which it is guided to reciprocate vertically. A pivoted link N is provided to secure the proper movement of the upper end of the lever Z, which also is provided with a roller where it adjoins the cam Q. This cam Q, attached to the end of the shaft M, is so set in relation to the elliptical wheels D and F that it allows of the plunger S descending at the time when the pug-mill shaft has its quickest rotation, and when therefore it extrudes the material quickest from the pug-mill.

After the mold is filled with compressed clay it is drawn away from the mouth of the pug-mill by the action of the lever $g$, the link $f$, and the slotted drum or cam $k$, carried by the shaft M. The link is pivoted in one end $e$ of the mold-box $d$ and connected at its other end to the lever $g$, which is pivoted so as to oscillate about the spindle $h$, the other end being provided with a bowl $i$, which works in the irregular slot $j$ of the drum $k$ and is so set in regard to the elliptical wheels D F that when the pug-mill shaft is decreasing in speed the mold-box is drawn away. The movement of the mold-box sidewise causes the parting of the clay stream by the triangular side bars $m$ $m$, held in place by the cross-bars $n$ $n$, which in their turn are secured by the bolts $o$ passing through the brackets $p$, attached to the ends of the outlet. As the mold R is pulled away, its place beneath the pug-mill mouth is taken by the back part of the mold-box $d$, provided with a facing-plate $c$. At the same time the plunger S is drawn across the top of the platform T, and upon reaching the other side it is immediately raised in the mold by the further action of the cam Q and the connecting-levers.

The mold-box is provided with sliding surfaces $b$ $b$, which slide over the surfaces $a$ $a$, formed on the casing U. The mold itself is formed with liners, which can be renewed by unbolting a removable side which is provided on the mold-box.

After being raised level with the table by the rise of the platform and plunger before mentioned the clot of clay is caught by the rake $r$ and passed onto the table 1 of the press proper. The mechanism by which the rake $r$ is operated consists of a cam $y$ on the shaft M, which actuates levers $x$ and $v$, pivoted on the spindle $w$, so that the bottom end of the lever $v$ is reciprocated backward and forward. To it, by means of the link $u$, is connected a piece $s$, to which the rake $r$ is attached and which slides on the slide-bar $t$, secured in a suitable position by bolting to brackets on the framework of the machine.

In order that the bowl of the cam-lever $x$ shall remain in contact with the face of the cam, a rod 10 is connected at one end to the lever $v$ and at the other end to a spring $z$, interposed between the said head and a fixed part of the machine-frame, so that the spring is always in compression, and thus keeps the bowl against the cam.

Figure 4:
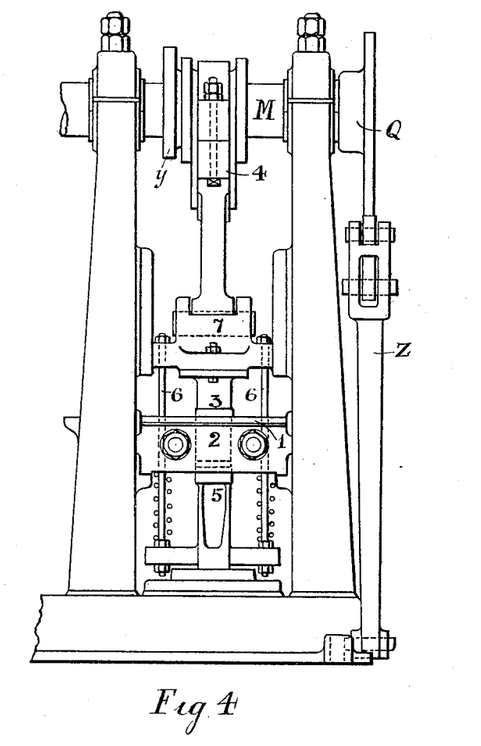
Fig. 4 shows a side view of the press.

The rake $r$ pushes the clot onto the table 1 of the press, where it remains until the succeeding clot is formed, when it is pushed over the mold 2 by the next action of the rake and the succeeding clot, which in like manner remains on the table until pushed forward by another clot. The clot is pressed in the mold 2 by the action of the cross-head 7 and the plunger 3, Fig. 4, operated by the eccentric 4, which presses the clot between the plungers 3 and 5. The brick is pushed out of the mold by the raising of the bottom plunger 5, connected to the cross-head by the rods 6 6, and is pushed off the top face of the plunger when level with the table by the movement of the incoming clot.

Figure 1:
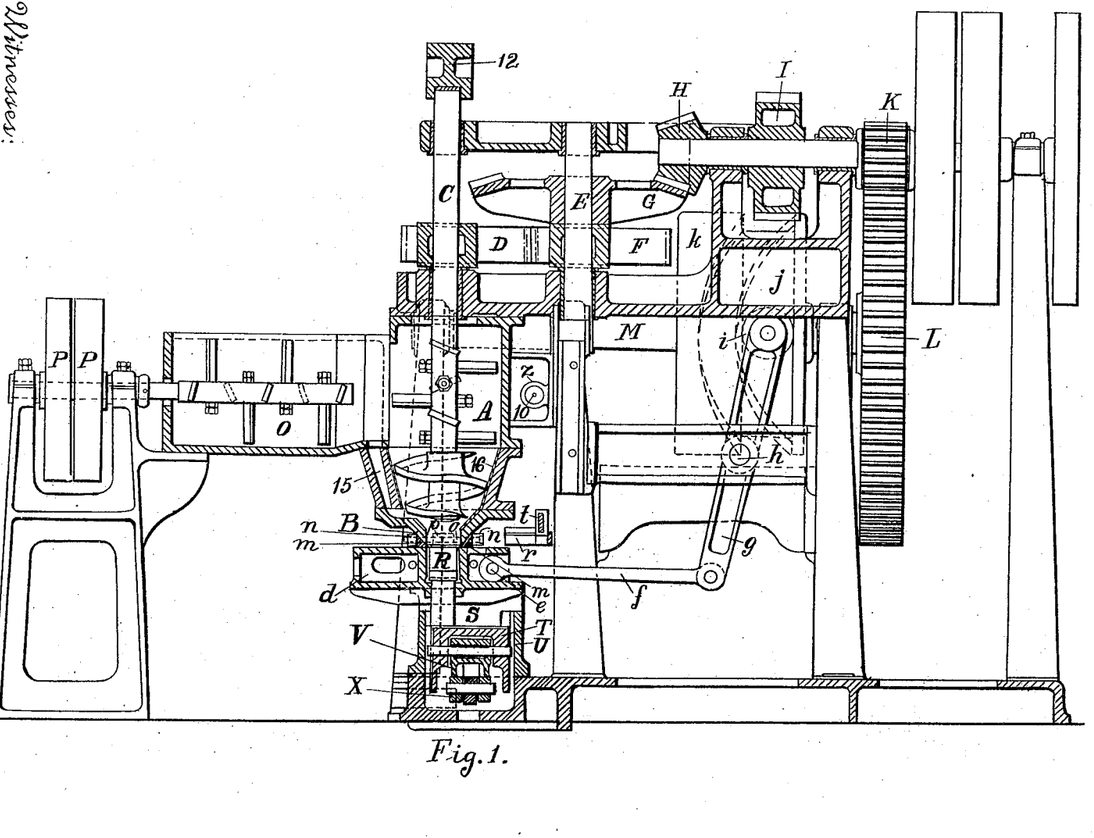
Figure 1 is a side view, partly in section, of the machine, taken on the line $q$ $q$ of Fig. 2.
Figure 2:
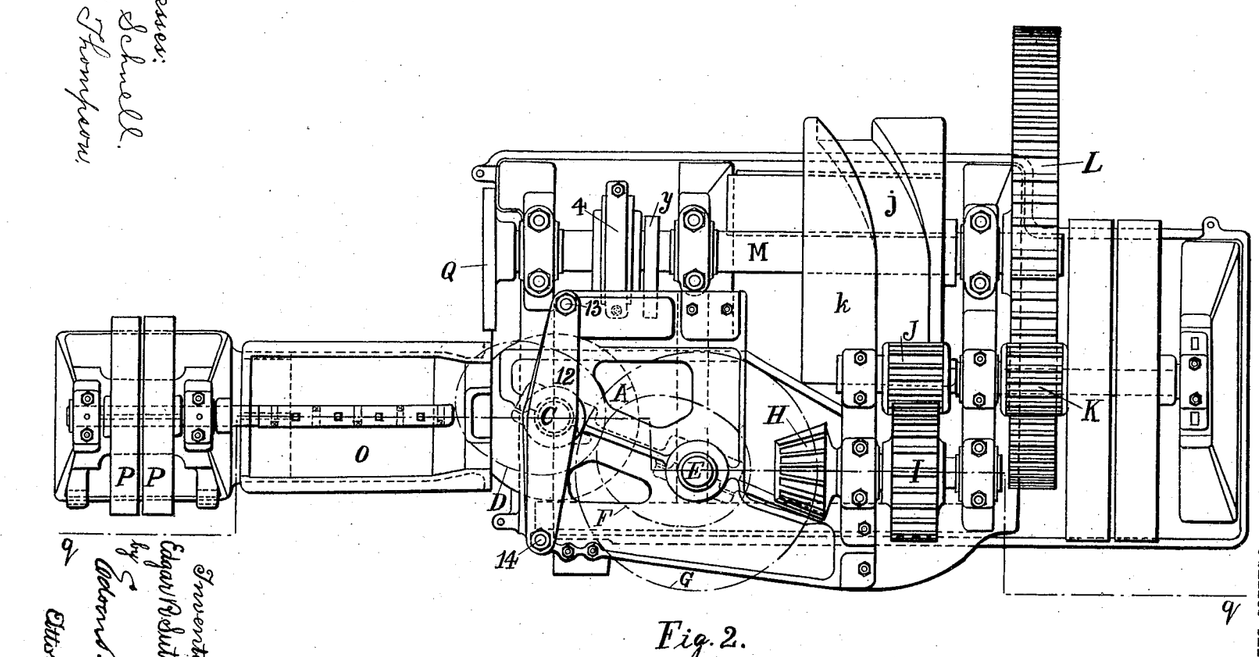
Fig. 2 is a plan of the machine.
Figure 3:
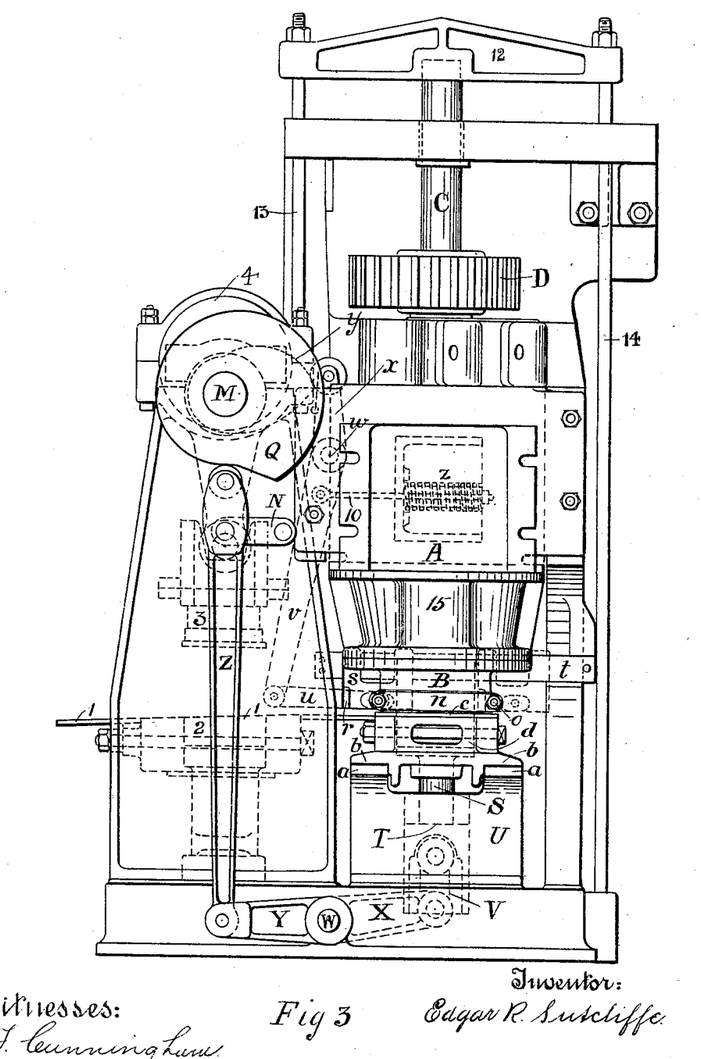
Fig. 3 is an end view showing the mechanism for passing the clot to the final press.
Figure 5:
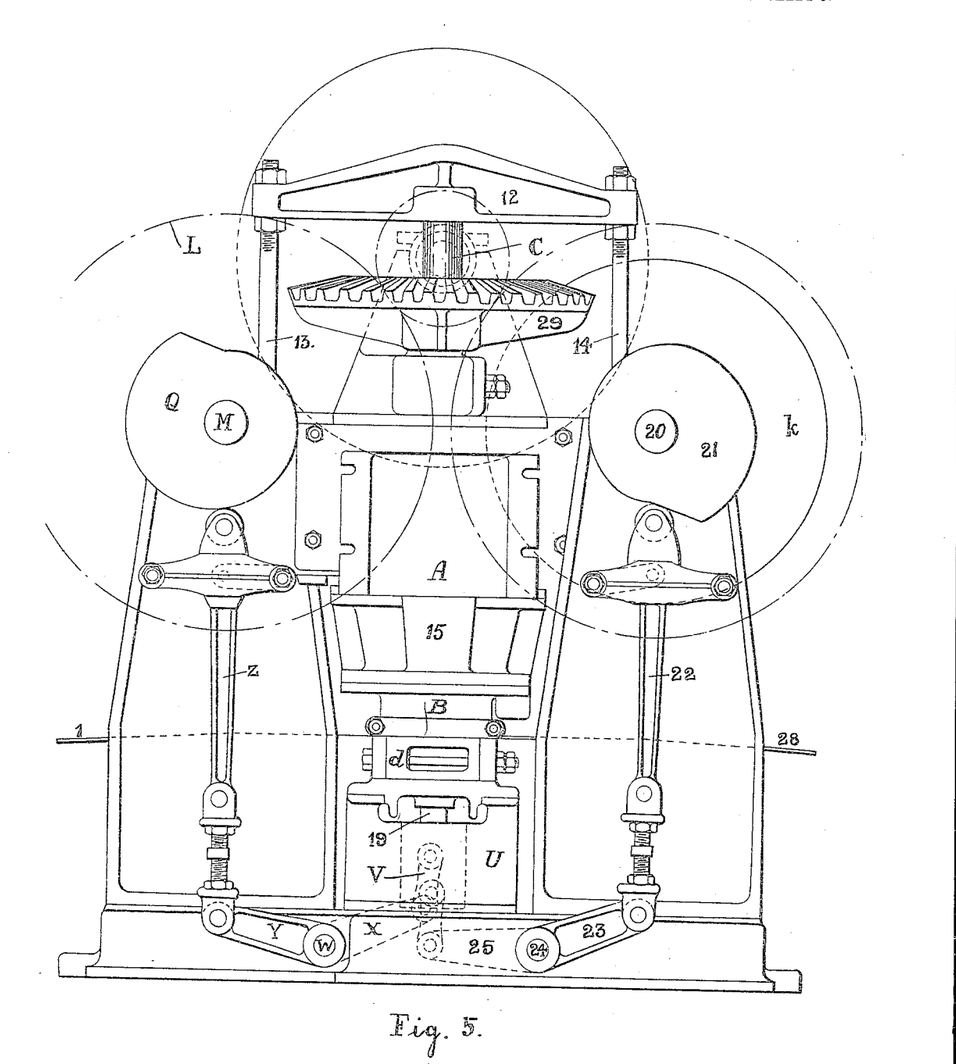
Fig. 5 is an elevation of a duplex form of the invention having two molds.
Figure 6:
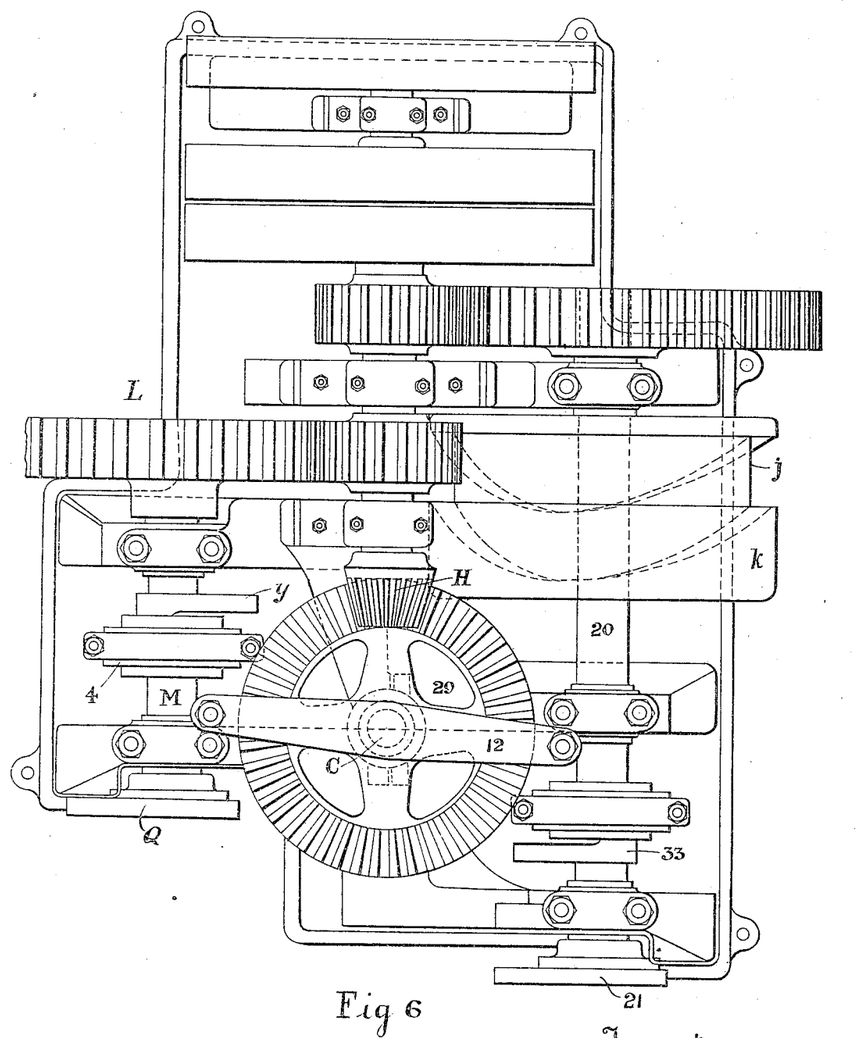
Fig. 6 is a plan of same.
Figure 7:
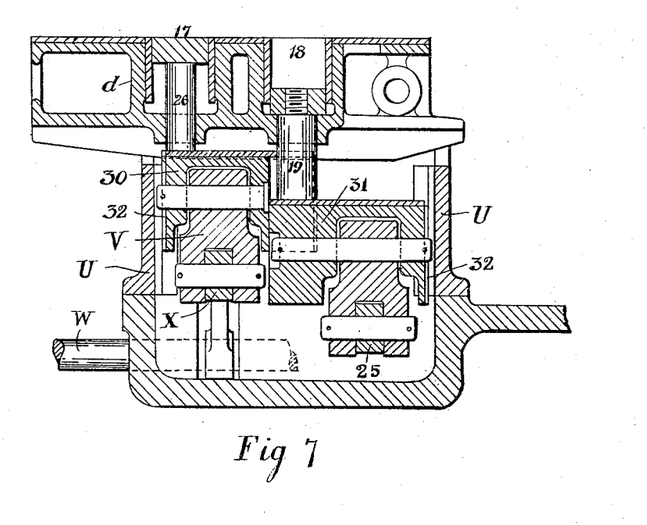
Fig. 7 is a sectional elevation of the mold-box and operating-platforms of the duplex machine.
Figure 8:
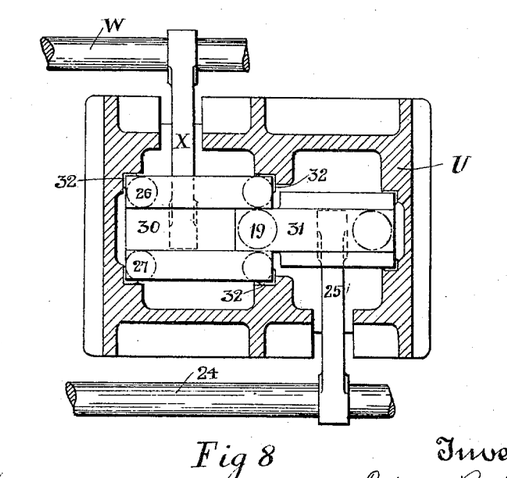
Fig. 8 is a plan of the platforms and support, partly in section.

In Figs. 5 and 6 is shown a modification of this invention in which a duplex arrangement is carried out, there being two presses fed from a single pug-mill. It will be seen that the arrangement of the left-hand press and the pug-mill is substantially the same as before; but an additional press is added on the right-hand side with a duplicate set of cam-and-lever mechanism 21 22 23 24 25 for operating the platform and plungers of the reciprocating mold-box $d$. This mold-box is constructed with two molds 17 and 18, each fitted with plungers and so placed that one mold is being filled while the material is being pushed out of the other mold. In order that this may be accomplished, it will be seen on reference to Figs. 7 and 8 that the platforms 30 and 31, though contained within one guide-box U, are raised or lowered by the levers X and 25 independently of each other and in accordance with the movement of the cams Q and 21 on the shafts M and 20, respectively, which are set in respect to each other so that the platform 30 is rising while 31 is falling, and vice versa. In order to save space while obtaining a sufficient length of platform to allow of the plungers remaining thereon and at the same time following the reciprocation of the mold-box, the single platform 31 is meshed into the double platform 30, which forms a guide for same in conjunction with corner-pieces 32, attached to the corners of the platform and working in recesses of the casting U. In order that the plungers shall not foul each other, the plunger in the mold 17 is provided with two stems 26 and 27, carried by the outer portions of the platform 30, while the single stem 19 of the plunger in mold 18 is carried centrally on platform 31. Both platforms have bearing-plates which can be renewed when worn. The reciprocation of the mold-box is effected as before by levers and a drum-cam $k$, having a suitable slot cut in its circumference. In this case, however, the drum-cam *k* is carried by the additional shaft 20. The operation of the rake to pass on the clots is also effected as before shown in Fig. 3, an extra cam 33 being added on shaft 20 and similar mechanism to bring the alternate clots onto the table 28 of the right-hand press. By using this device the necessity for elliptical wheels is removed, as the pug-mill can be feeding the molds almost continuously, and waste of power is thus prevented, while a larger output of bricks is secured.

I am aware that prior to my invention pug-mills have been made with the outlet feeding into a recess having a retiring plunger. I therefore do not claim such a combination broadly; but What I do claim as my invention, and desire to secure by Letters Patent, is—

1. The combination in a brick-making machine, of a pug-mill and means for driving same, with a reciprocating mold-box, a drum-and-lever mechanism for reciprocating same, a plunger working in said mold-box, and a cam-and-lever mechanism for effecting the rise and fall of the plunger in the mold so that the mold is filled with material under pressure, all substantially as set forth.

2. In a brick-making machine and in combination, a pug-mill, a mold box or table having a mold, means for traversing said table across the mouth of the pug-mill, a plunger working in said mold, a single platform controlling both the rise and fall of the plunger thereon, and means for operating same so that the mold is first filled with material under pressure and then the clot of pressed material is pushed out, substantially as described herein.

3. The combination in a brick-making machine, of a pug-mill and means for driving same, with a reciprocating mold-box, a drum-and-lever mechanism for reciprocating same, a plunger working in the mold, a cam-and-lever mechanism for effecting the feeding of the material under pressure and the pushing out of the clot, and a cam, lever, and slide mechanism for drawing the clot away from the mold, substantially as described.

4. The combination in a brick-making machine, of a pug-mill with a brick-press, means for driving same from a common first-motion shaft and pulleys, a reciprocating mold-box, a drum-and-lever mechanism for reciprocating same, a plunger working in the mold, a cam-and-lever mechanism for operating the plunger so as to effect the feeding of the material under pressure and the pushing out of the clot, and a cam-and-lever mechanism to operate a sliding rake for passing the clot onto the table of the brick-press, substantially as described.

5. The combination in a brick-making machine, of a pug-mill having a spirally-grooved mouthpiece, a feeding-trough adapted to feed into the pug-mill, an escape-passage connecting the mouth of the pug-mill with the feeding-trough, a cross-head and tension-bars for taking the end thrust of the pug-mill shaft, a reciprocating mold containing a plunger, and a cutting-off apparatus attached to the mouth of the pug-mill substantially as herein described.

6. The combination in a brick-making machine, of a reciprocating mold-box having a mold containing a plunger, a support forming a slide for the mold-box, a platform contained within the mold-box support, a cam and levers for operating said platform to raise or lower the plunger as required both for receiving material under pressure and for pushing the clot out of the mold, and means for reciprocating the mold-box, substantially as set forth.

7. The combination in a brick-making machine of a pug-mill and means for driving same, with a reciprocating mold-box, a drum-and-lever mechanism for reciprocating same, two plungers working in said mold-box and a duplex cam-and-lever mechanism for effecting the rise and fall of the plungers in the molds so that one mold is being filled with material under pressure while the clot is being pushed out of the other mold all substantially as set forth.

8. The combination in a brick-making machine of a pug-mill with two brick-presses, means for driving same from a common first-motion shaft and pulleys, a reciprocating mold-box containing two molds, a drum-and-lever mechanism for reciprocating same, plungers working in each mold, duplicate cam-and-lever mechanism for operating the plungers so as to effect the feeding of the material under pressure in one mold while the clot is being pushed out of the adjoining mold, and duplicate cam-and-lever mechanisms to operate sliding rakes for drawing the clots onto the table of each brick-press alternately substantially as described.

9. In a brick-making machine and in combination, a pug-mill and means for driving same, a reciprocating mold-box with two molds receiving material from the pug-mill alternately, means for reciprocating the mold-box, a double-stem plunger in one mold and a single-stem plunger in the other, a duplex platform contained within a common support and adapted to said plungers respectively, and duplex cam-and-lever mechanism for operating the platform, substantially as shown and for the purpose set forth.

In testimony that I claim the foregoing as my invention I have signed my name in presence of two subscribing witnesses.

EDGAR ROUSE SUTCLIFFE.

Witnesses:
 H. D. JAMESON,
 A. NUTTING.